United States Patent [19]

Kasuga

[11] Patent Number: 5,588,740
[45] Date of Patent: Dec. 31, 1996

[54] BACKLIGHT DEVICE FOR A LIQUID CRYSTAL DISPLAY FACILITATING THE REPLACEMENT OF A LAMP THEREOF

[75] Inventor: Koji Kasuga, Tokyo, Japan

[73] Assignee: NEC Corporation, Tokyo, Japan

[21] Appl. No.: 331,192

[22] Filed: Oct. 28, 1994

[30] Foreign Application Priority Data

Oct. 29, 1993 [JP] Japan .................... 5-292506

[51] Int. Cl.⁶ ................................. F21V 23/00
[52] U.S. Cl. ................ 362/221; 362/226; 362/377; 313/318.11; 439/95; 439/108; 439/239
[58] Field of Search .................... 439/95, 108, 226, 439/228, 235, 239; 362/23, 221, 306, 376, 377, 378, 226, 262, 263, 265; 313/25, 113, 318.01, 318.02, 318.03, 318.11; 315/311, 324

[56] References Cited

U.S. PATENT DOCUMENTS

| | | | |
|---|---|---|---|
| 2,391,325 | 12/1945 | Maurette | 439/95 |
| 2,438,012 | 3/1948 | Laidig | 362/221 |
| 2,566,426 | 9/1951 | Parks | 315/324 |
| 3,593,060 | 7/1971 | Kryder | 313/113 |
| 4,042,819 | 8/1977 | Dacal | 362/376 |
| 4,229,780 | 10/1980 | Nelson | 362/376 |
| 4,791,333 | 12/1988 | Morris et al. | 313/113 |
| 4,958,267 | 9/1990 | Baake | 362/221 |
| 5,019,749 | 5/1991 | Ito | 315/311 |
| 5,072,347 | 12/1991 | Brunson | 362/306 |
| 5,349,505 | 9/1994 | Poppenheimer | 362/101 |

FOREIGN PATENT DOCUMENTS

| | | |
|---|---|---|
| 63-38981 | 2/1988 | Japan . |
| 4-104486 | 4/1992 | Japan . |
| 4-288526 | 10/1992 | Japan . |

*Primary Examiner*—Ira S. Lazarus
*Assistant Examiner*—Alan B. Cariaso
*Attorney, Agent, or Firm*—Sughrue, Mion, Zinn, Macpeak & Seas

[57] ABSTRACT

A backlight device for a liquid crystal display has a lamp and a lamp holder surrounding the lamp. The lamp holder is made of a conductive material to play the role of a cable and has one end thereof implemented as a socket capable of mating with a base provided on the lamp. The lamp can be replaced easily without resorting to troublesome manipulation.

10 Claims, 3 Drawing Sheets

5,588,740

BACKLIGHT DEVICE FOR A LIQUID CRYSTAL DISPLAY FACILITATING THE REPLACEMENT OF A LAMP THEREOF

BACKGROUND OF THE INVENTION

The present invention relates to a backlight device for a liquid crystal display (LCD) and, more particularly, to a backlight device with an implementation for facilitating the replacement of a lamp thereof.

An LCD with a backlight device has customarily been used with various kinds of equipment. A lamp included in the backlight device is replaced from time to time in order to insure the backlighting ability of the device. Generally, the lamp is disposed in a lamp holder and supported by a fixed socket and a removable socket which are connected to a power source. To replace the lamp, the removable socket is removed from the lamp, and then the lamp is pulled out from the fixed socket. The removable socket may be provided with a lid-like configuration which forms part of the casing of equipment, as taught in Japanese Patent Laid-Open Publication No. 4-288526. Alternatively, the removable socket may be hinged to the casing of equipment and form part of the casing, as disclosed in Japanese Patent Laid-Open Publication No. 63-38981. Further, the removable socket may be configured in such a manner as to be movable away from the fixed socket located below the removable socket, as taught in Japanese Patent Laid-Open Publication No. 4-104486.

However, the conventional lamp replacing mechanism implemented by the fixed socket and removable socket needs a cable for connecting at least one of the sockets to the power source. Since such a cable is often laid along the side of the lamp holder in order to reduce the thickness of the LCD, the overall size of the LCD is increased. In addition, the cable connecting the power source to the removable socket is troublesome to handle in the event of lamp replacement.

SUMMARY OF THE INVENTION

It is, therefore, an object of the present invention to provide a backlight device for an LCD which facilitates the replacement of a lamp thereof.

It is another object of the present invention to provide a backlight device which reduces the overall size of an LCD on which it is mounted.

A backlight device for a liquid crystal display of the present invention has a lamp having a base at both ends thereof, and a lamp holder made of a conductive material for reflecting and condensing light issuing from the lamp. The lamp holder is electrically connected to a ground terminal of a power source, which selectively turns on the lamp, at one end and mates with one of the bases of the lamp at the other end.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
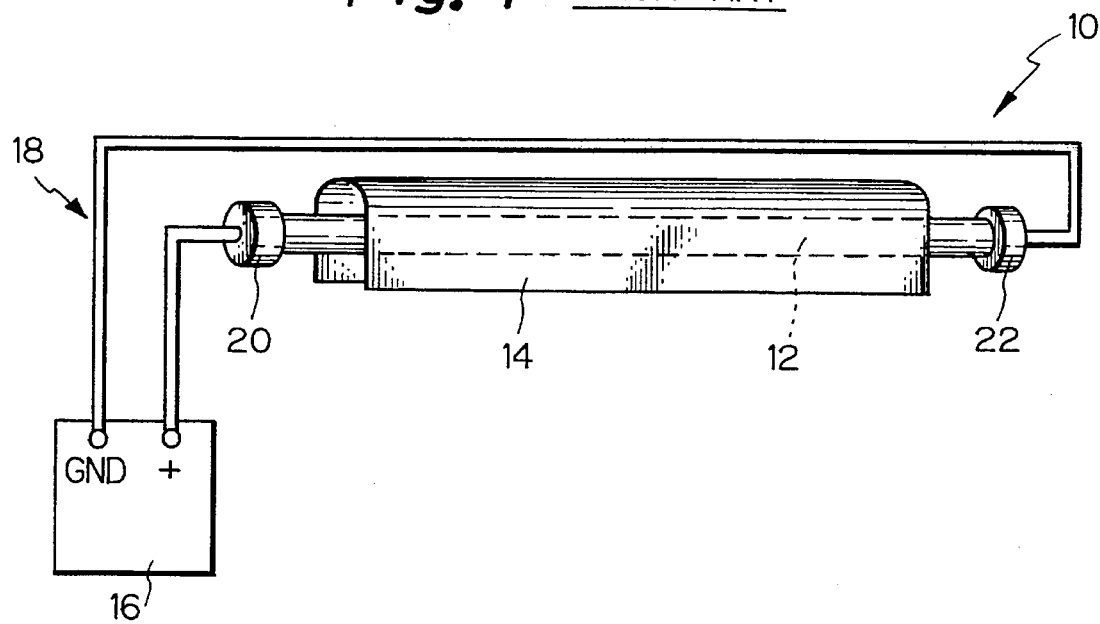
FIG. 1 is a view of a conventional backlight device.

To better understand the present invention, a brief reference will be made to a conventional backlight device for an LCD, shown in FIG. 1. As shown, the LCD, generally 10 has a lamp 12, a lamp holder 14 for reflecting and condensing light from the lamp 12 efficiently, an inverter board 16 playing the role of a power source for turning on the lamp 12, cables 18 connecting the inverter board 16 and lamp 12, and a fixed socket 20 and a removable socket 22 connecting the cable 18 and lamp 12.

Figure 2A:
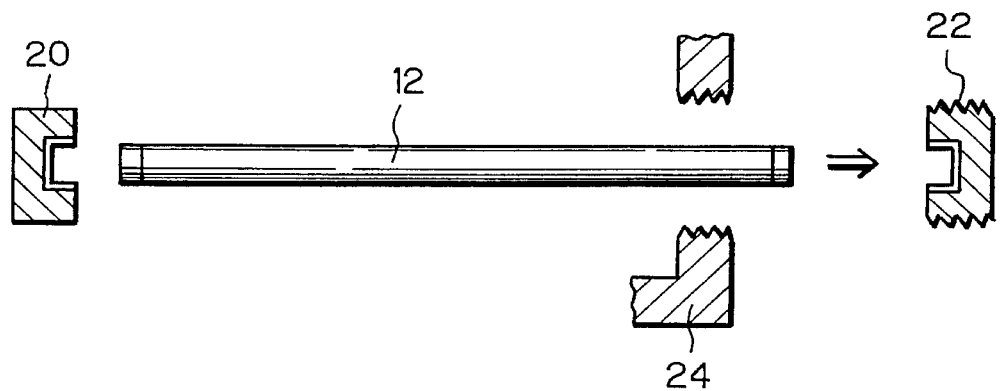
FIGS. 2A and 2B are expoded views each showing a specific configuration of a removable socket included in the conventional backlight device.
Figure 2B:
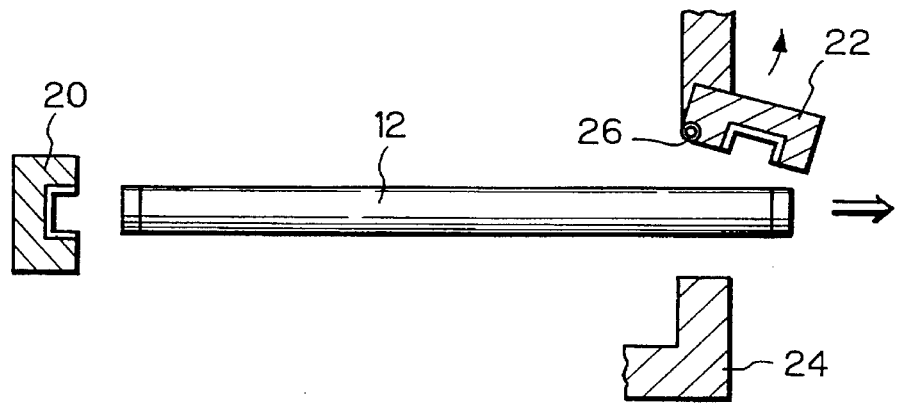

FIGS. 2A and 2B each shows a specific arrangement heretofore proposed to facilitate the replacement of the lamp 12. In FIG. 2A, the removable socket 22 has a lid-like configuration which forms part of a casing 24 connected to ground, as taught in, for example, the previously mentioned Japanese Patent laid-Open Publication No. 4-288526. In FIG. 2B, the removable socket 22 is rotatably connected to the casing 24 by a hinge 26, as disclosed in, for example, the previously mentioned Japanese Patent Laid-Open Publication No. 63-38981. In any case, to replace the lamp 12, the socket 22 is removed from the lamp 22, and then the lamp 12 is pulled out from the casing 24 in a direction indicated by an arrow. Subsequently, a new lamp is inserted into the casing 24 by the opposite procedure.

The problem with the conventional backlight device is that one of the cables 18 is essential in connecting the power source 16 to the socket 20 or 22. Since such a cable 18 is often laid along the side of the lamp holder 14 in order to reduce the thickness of the LCD 10, the overall size of the LCD is increased. In addition, the cable 18 connecting the power source 16 to the removable socket 22 is troublesome to handle in the event of replacement of the lamp 12.

Figure 3:
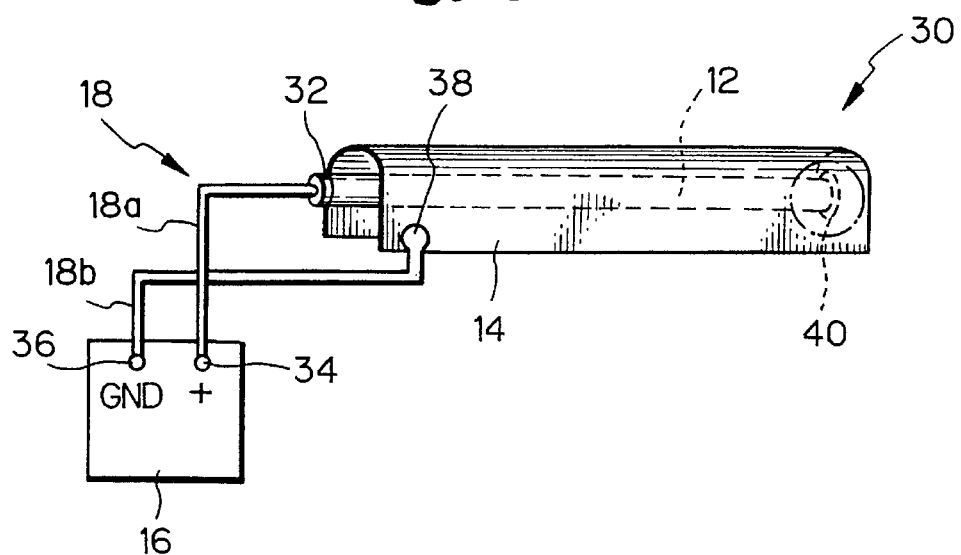
FIG. 3 is a view of a backlight device embodying the present invention.

Referring to FIG. 3, a backlight device embodying the present invention is shown. In the figure, the same or similar constituent parts as or to the parts of the conventional device described above are designated by the same reference numerals. As shown, the backlight device, generally 30, includes a lamp 12 having a base 32 at the left end, or high voltage end, as viewed in FIG. 3. A cable 18a is soldered at one end to the base 32 and at the other end to an inverter board or power source 16. Alternatively, the electrical connection of the cable 18a to the inverter 16 may be implemented by a connector, if desired. A lamp holder 14 has a generally U-shaped cross-section and surrounds the lamp 12 in order to reflect and condense light from the lamp 12 efficiently. The lamp holder 14 is made of aluminum or similar conductive material. The inverter board 16 has a ground terminal (GND) 36 connected to one end (left end as viewed in the figure) of the lamp holder 14 by a cable 18b. The cable 18b is connected to the inverter board 16 and lamp holder 14 by soldering. The other end of the lamp holder 14 is implemented as a mating portion 40 for mating with another base provided at the other end of the lamp 12, as will be described hereinafter.

Figure 4A:
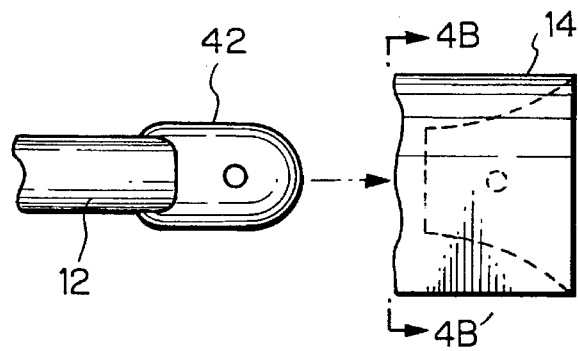
FIG. 4A is an exploded view showing a specific configuration of a mating portion included in the embodiment and how a lamp is mated therewith.
Figure 4B:
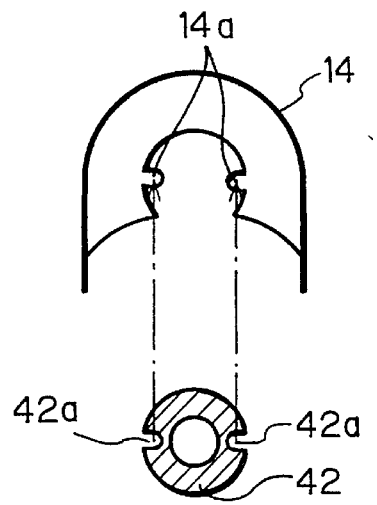
FIG. 4B is a section along line 4B—4B' of FIG. 4A.

FIGS. 4A and 4B show a specific configuration of the mating portion 40 of the lamp holder 14. As shown, the right end of the lamp holder 14 is squeezed inward in a funnel configuration so as to contact the outer periphery of the base, labeled 42, provided on the lamp 12. Lugs 14a extend from the funnel portion of the lamp holder 14 toward each other. The base 42 is formed with recesses 42a in the outer periphery thereof which are respectively capable of mating with the lugs 14a of the lamp holder 14.

Figure 5A:
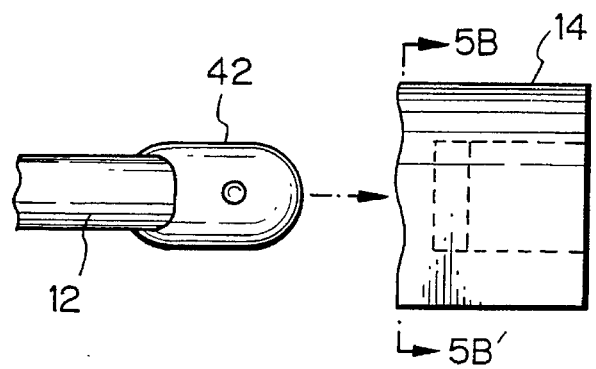
FIG. 5A is a view similar to FIG. 4A, showing another specific configuration of the mating portion.
Figure 5B:
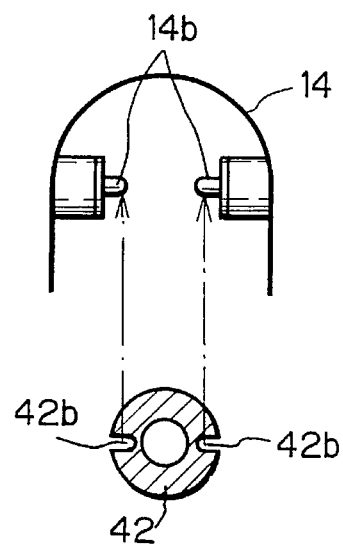
FIG. 5B is a section along line 5B—5B' of FIG. 5A.

FIGS. 5A and 5B show another specific configuration of the mating portion 40. As shown, ear-like portions are left at the right end of the lamp holder 14 and bent inward to form leaf spring portions. These bent portions make point-to-point contact with the base 42 of the lamp 12. Specifically, as shown in FIG. 5B, lugs 14b included in the bent portions contact recesses 42b formed in the outer periphery of the base 42 of the lamp 12.

The mating portion 40 having any of the specific configurations stated above mates with the base 42 of the lamp 12 under a pressure of about 500 g and with a resistance less than 1Ω. The ground terminal 36 of the inverter board 16 and the ground end of the lamp 12 are electrically connected to the contact of the mating portion 40 by the cable 18b and lamp holder 14.

To replace the lamp 12, the cable 18a is removed from the high voltage (+) terminal 34 of the inverter board 16 by, for example, removing solder or pulling it out from a connector. Subsequently, the lamp 12 is pulled out from the lamp holder 14 to the left, as viewed in FIG. 3. As a result, the lamp 12 is released from the lamp holder 40. Thereafter, a new lamp is inserted into the lamp holder 14 until it contacts the mating portion 40 of the lamp holder 14, and then the cable 18b is again connected to the high voltage (+) terminal of the inverter board 16.

Figure 6:
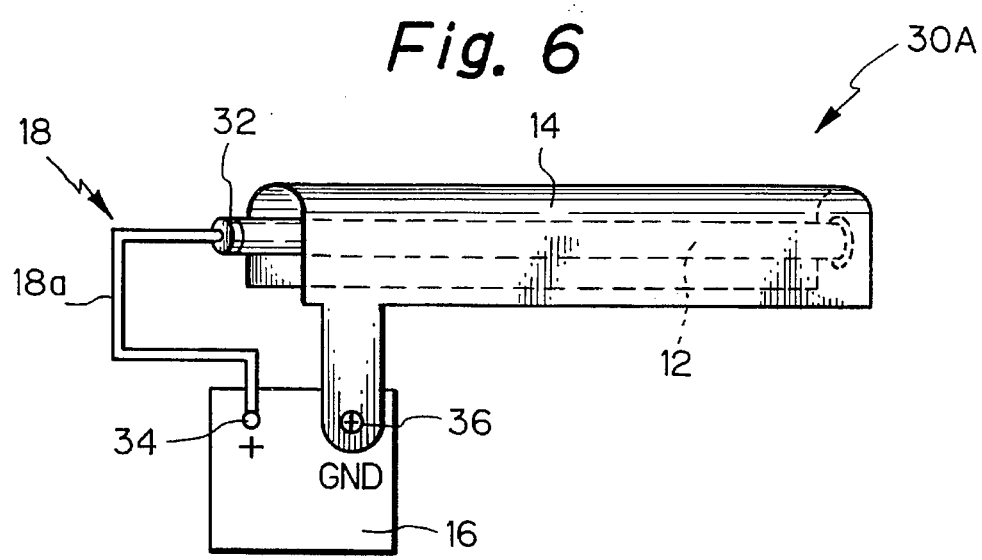
FIG. 6 is a view showing an alternative embodiment of the present invention.

An alternative embodiment of the present invention is shown in FIG. 6. As shown, a backlight device, generally 30A, is characterized in that the end of the lamp holder 14 adjoining the power source 16, i.e., the left end is partly extended to form a flat extension. This extension, or connecting portion, is directly fastened to the ground terminal 36 of the inverter board 16 by a screw. As a result, even the cable 18b included in the previous embodiment is omissible. The rest of the construction, including the mating portion 40, is essentially the same as in the previous embodiment.

In summary, it will be seen that the present invention provides a backlight device which does not need an extra space for cables and, therefore, reduces the overall size of an LCD. A lamp included in the backlight device can be replaced only if it is pulled out from a lamp holder, facilitating lamp replacement in an LCD. These advantages are derived from a unique arrangement wherein the lamp holder is made of a conductive material to play the role of a cable and has one end thereof implemented as a socket capable of mating with a base provided on the lamp.

The lamp holder has a flat extension extending from an end, which adjoins a power source, perpendicularly to the lengthwise direction thereof. The extension mechanically contacts the ground terminal of the power source, thereby electrically connecting the lamp holder to the power source. This also contributes a great deal to the miniaturization of an LCD and facilitates the replacement of the lamp.

Various modifications will become possible for those skilled in the art after receiving the teachings of the present disclosure without departing from the scope thereof. For example, while the lamp holder 14 has been shown and described as being made of a conductive material, it may be made of a substantially insulative material, in which case a conductive member will be located between the contact point of mating portion 40 and the base 42 of the lamp 12 and the ground terminal 36 of the power source 16. Such a conductive member may be formed by patterning a conductive member or disposing a piece of conductive foil. Further, the lamp holder 14 and the base 42 of the lamp 12 may be provided with the recesses 42a or 42b and the lugs 14a or 14b, if desired.

What is claimed is:

1. A backlight device for a liquid crystal display comprising:

a lamp having a first electrode and a second electrode at opposite ends thereof; and a lamp reflector made of a conductive material for reflecting light issuing from said lamp, said lamp reflector being electrically connected to a ground terminal of a power source at one end and mating with said first electrode of said lamp at the other end, wherein said second electrode is electrically connected to a positive terminal of said power source, and wherein said other end of said lamp reflector is squeezed inward in a funnel configuration for mating with said first electrode of said lamp.

2. The backlight device as claimed in claim 1, wherein said lamp reflector is electrically connected to said ground terminal of said power source by a cable.

3. The backlight device as claimed in claim 1, wherein said lamp reflector has an extension mechanically contacting said ground terminal of said power source to thereby electrically connecting said lamp reflector to said power source.

4. The backlight device as claimed in claim 1, wherein said lamp reflector has an extension member at said one end of said lamp reflector mechanically contacting said ground terminal of said power source.

5. A backlight device for a liquid crystal display comprising:

a lamp having a first electrode and a second electrode at opposite ends thereof; and a lamp reflector made of a conductive material for reflecting light issuing from said lamp, said lamp reflector being electrically connected to a ground terminal of a power source at one end and mating with said first electrode of said lamp at the other end, wherein said second electrode is electrically connected to a positive terminal of said power source, and wherein said other end of said lamp reflector has a pair of connecting protrusions, and said first electrode of said lamp has a pair of recesses in which said protrusions are respectively received.

6. The backlight device as claimed in claim 1, wherein said reflector also holds said lamp.

7. A backlight device for a liquid crystal display comprising:

a lamp having a first electrode at a first portion thereof and a second electrode at a second portion thereof different from said first portion;

a lamp reflector surrounding at least said first portion of said lamp and being made of a conductive material, said lamp reflector being electrically connected to said first electrode of said lamp; and means for supplying a ground voltage to said lamp reflector and supplying a positive voltage to said second electrode of said lamp, wherein during an operation of said backlight device, electricity flows through said lamp reflector as a result of a voltage differential between said first and second voltages, and wherein said other end of said lamp reflector is squeezed inward in a funnel configuration for mating with said first electrode of said lamp.

8. The backlight device as claimed in claim 7, wherein said lamp has a stick shape, and wherein said first portion is one end of said lamp and said second portion is another end of said lamp.

9. The backlight device as claimed in claim 7, wherein said reflector also holds said lamp.

10. A backlight device for a liquid crystal display comprising:

a lamp having a first electrode at a first portion thereof and a second electrode at a second portion thereof different from said first portion;

a lamp reflector surrounding at least said first portion of said lamp and being made of a conductive material, said lamp reflector being electrically connected to said first electrode of said lamp; and means for supplying a ground voltage to said lamp reflector and supplying a positive voltage to said second electrode of said lamp, wherein during an operation of said backlight device, electricity flows through said lamp reflector as a result of a voltage differential between said first and second voltages, and wherein said other end of said lamp reflector has a pair of connecting protrusions, and said first electrode of said lamp has a pair of recesses in which said protrusions are respectively received.

\* \* \* \* \*